(12) United States Patent
Togashi et al.

(10) Patent No.: US 8,327,162 B2
(45) Date of Patent: Dec. 4, 2012

(54) NETWORK COMMUNICATION SYSTEM FOR UNINTERRUPTIBLE POWER SUPPLY AND METHOD FOR GROUPING CONTROLLERS THEREIN

(75) Inventors: Fujitaka Togashi, Tokyo (JP); Masato Suzuki, Tokyo (JP); Masataka Ookawa, Massia (JP)

(73) Assignee: TDK-Lambda Corporation (JP)

( * ) Notice: Subject to any disclaimer, the term of this patent is extended or adjusted under 35 U.S.C. 154(b) by 373 days.

(21) Appl. No.: 12/600,929

(22) PCT Filed: May 19, 2008

(86) PCT No.: PCT/JP2008/059108
§ 371 (c)(1),
(2), (4) Date: Nov. 19, 2009

(87) PCT Pub. No.: WO2008/146633
PCT Pub. Date: Dec. 4, 2008

(65) Prior Publication Data
US 2010/0162009 A1     Jun. 24, 2010

(30) Foreign Application Priority Data
May 25, 2007   (JP) .................. 2007-138807

(51) Int. Cl.
*G06F 1/00* (2006.01)
*G06F 15/173* (2006.01)
*G06F 11/00* (2006.01)
*H02J 1/10* (2006.01)
*H01F 17/00* (2006.01)
*H02H 3/08* (2006.01)
*H02M 7/08* (2006.01)

(52) U.S. Cl. .......... 713/300; 713/310; 307/43; 323/355; 361/93.1; 363/67; 709/224; 714/14

(58) Field of Classification Search .................. 713/300, 713/310; 307/43; 323/355; 361/93.1; 363/67; 709/224; 714/14
See application file for complete search history.

(56) References Cited

U.S. PATENT DOCUMENTS

| 7,350,088 B2 * | 3/2008 | Allison et al. ................. 713/300 |
| 2003/0033548 A1 * | 2/2003 | Kuiawa et al. ................. 713/300 |
| 2004/0215693 A1 * | 10/2004 | Thompson ..................... 709/201 |
| 2005/0071699 A1 * | 3/2005 | Hammond et al. ........... 713/300 |
| 2005/0216578 A1 * | 9/2005 | Thompson ..................... 709/223 |

FOREIGN PATENT DOCUMENTS

| JP | 3443575 | 6/2003 |
| JP | 2005-078174 | 3/2005 |
| JP | 2005-174195 | 6/2005 |
| JP | 2006-340286 | 12/2006 |

* cited by examiner

*Primary Examiner* — Stefan Stoynov
(74) *Attorney, Agent, or Firm* — Stephen Chin

(57) ABSTRACT

Even if a network setting changes due to power interruption or the like, communication for controlling the operating status of load devices of an uninterruptible power supply is enabled to continue. A network communication system (1) for the uninterruptible power supply comprises UPS member controllers (12 and 13) and a UPS group controller (11) which are connected in a network (2) to control the operating status of the load devices (3) of the uninterruptible power supply (1). The UPS group controller (11) and the UPS member controllers (12 and 13) execute data communication according to a predetermined communication protocol (Internet Protocol or the like) through the network (2), and these controllers transmit/receive data in which specific identification information issued for each of the UPS member controllers (12 and 13) is added to control data as communication data in the data communication according to the predetermined communication protocol.

9 Claims, 7 Drawing Sheets

NETWORK COMMUNICATION SYSTEM FOR UNINTERRUPTIBLE POWER SUPPLY AND METHOD FOR GROUPING CONTROLLERS THEREIN

CROSS REFERENCES TO RELATED APPLICATIONS

This application claims priority to international application number PCT/JP 2008/059108 filed on May 19, 2008 which claims priority to Japanese patent application number 2007-138807 on May 25, 2007, the entire disclosures of which are hereby incorporated by reference.

BACKGROUND OF THE INVENTION

1. Field of the Invention

The present invention relates to a network communication system for an uninterruptible power supply (abbreviated as UPS); and a method for grouping controllers by UPS, the controllers performing communication for controlling operating status of load devices of UPSs.

2. Description of the Related Art

Patent Document 1 discloses a control system for a UPS. A plurality of controllers for controlling the UPS and load devices of the same are connected in a network of the control system. Patent Document 1 discloses a configuration of the system as an embodiment in which an IP address (an Internet Protocol address) of a host controller is registered beforehand in each controller so that the controller communicates with the host controller by using the registered IP address. Patent Document 1: JP 3443575 B (see FIG. 1, Paragraph 0073, Claims, detailed descriptions of the invention, etc.)

BRIEF SUMMARY OF THE INVENTION

By making use of the configuration of the control system disclosed in Patent Document 1, it becomes possible to control a shutdown of load devices of a UPS through issuing a shutdown command from the controller connected in the network to controllers of the load devices of the UPS.

However, in the control system disclosed in Patent Document 1, each controller is identified with its own IP address. Accordingly, if once IP addresses of the controllers are changed, the controllers cannot communicate with each other. Therefore, in the control system for controlling the UPS and load devices of the same, it is required to assign a fixed IP address to each controller so that the IP addresses do not change even in case of power interruption. In the case where each controller is identified with any network setting other than its IP address, the network setting needs to be free from any changes even in case of power interruption.

It is an object of the present invention to acquire a network communication system for a UPS enabling continuous communication for controlling operating status of load devices of the UPS even though network setting is changed due to power interruption and the like; and to acquire a method for grouping controllers by UPS, the controllers performing communication for controlling operating status of load devices of UPSs.

According to an aspect of the present invention, a network communication system for a UPS includes: one or more UPS member controllers for controlling operating status of load devices of the UPS; a UPS group controller for generating control data for the UPS member controllers to control operating status of the load devices according to power supply condition of the UPS; and a network in which the UPS member controllers and the UPS group controller are connected. The UPS group controller and the UPS member controllers execute data communication according to a predetermined communication protocol through the network, and these controllers transmit/receive data in which specific identification information issued for each of the UPS member controllers is added to the control data as communication data in the data communication according to the predetermined communication protocol.

When the configuration described above is adopted, the UPS group controller designates one of the UPS member controllers by using the identification information, and then transmits the control data to it. The identification information is transmitted from the UPS group controller to the UPS member controller together with the communication data according to the network setting of the predetermined communication protocol at the time of transmission.

Therefore, even if the network setting, such as IP addresses, is changed, the UPS member controllers choose the control data addressed to the UPS member controllers themselves individually, by using the identification information that is not affected by the change, so that the UPS member controllers can control operating status of the load devices according to the control data. As a result, even when the network setting is changed due to power interruption and the like, the control data for controlling the operating status of the load devices can be transmitted continuously.

The network communication system for a UPS according to the above aspect of the invention may include, in addition to the configuration described above, a feature in that the predetermined communication protocol is to identify the UPS group controller and the UPS member controllers, connected in the network, by using Internet Protocol addresses.

When the configuration described above is adopted, the UPS group controller and the UPS member controllers execute data communication by using specific identification information issued in a protocol layer higher than Internet Protocol, such as an application layer. The specific identification information is included in the communication data in Internet Protocol.

According to another aspect of the present invention, a network communication system for a UPS includes: one or more UPS member controllers for controlling operating status of load devices of the UPS; a UPS group controller for generating control data for the UPS member controllers to control operating status of the load devices according to power supply condition of the UPS; and a network in which the UPS member controllers and the UPS group controller are connected. The UPS group controller includes: a first protocol communication means for executing data communication through the network according to a predetermined communication protocol; a generating means for generating the control data according to power supply condition of the UPS; and an adding means for adding identification information specific to the UPS member controllers to the control data; and the UPS group controller transmits the control data, to which the identification information is added, as communication data to the network by using the first protocol communication means. The UPS member controllers include: a second protocol communication means for executing data communication through the network to/from the first protocol communication means according to the communication protocol; and a selecting means for selecting the control data, to which their identification information is added, out of communication data that the second protocol communication means receives so that the UPS member controllers control operating status of the load devices according to the selected control data.

When the configuration described above is adopted, the UPS group controller designates a UPS member controller by using the identification information, and then transmits the control data. The identification information is transmitted from the first protocol communication means to the second protocol communication means together with the communication data according to the network setting of the predetermined communication protocol at the time of transmission. Therefore, even if the network setting, such as IP addresses, is changed, the UPS group controller can transmit the control data to the UPS member controller and the UPS member controller can control operating status of the load devices according to the control data.

The network communication system for a UPS according to the above aspect of the invention may include, in addition to the configuration described above, features in that the UPS group controller is a computer terminal that directly communicates with the UPS, and the UPS group controller is supplied with electric power by the UPS and that the UPS group controller shuts down itself after transmitting the control data to the network by using the first protocol communication means.

When the configuration described above is adopted, it is possible to shut down the UPS group controller as one of the load devices of the UPS, for example, while keeping it possible for the UPS group controller to transmit control data during power interruption. Furthermore, still under the condition, it is not required to enable the UPS itself to communicate in the network.

The network communication system for a UPS according to the above aspect of the invention may include, in addition to each configuration described above, features in that the UPS group controller is provided in the UPS, the first protocol communication means includes a communication device that is detachable from the UPS, and a storage means for storing the identification information specific to the UPS member controllers, the generating means, and the adding means are provided in the UPS.

When the configuration described above is adopted; even if the communication device detachable from the UPS is replaced, the UPS as the UPS group controller can transmit control data to the UPS member controllers. Still further, it is not required that a computer terminal is functioned as a UPS group controller and that the computer terminal is connected to the UPS.

The network communication system for a UPS according to the above aspect of the invention may include, in addition to each configuration described above, a feature in that the UPS member controllers are computer terminals supplied with electric power by the UPS.

When the configuration described above is adopted, it is possible to appropriately control the operating status of the computer terminals supplied with electric power from the UPS under the condition of supplying backup electric power.

The network communication system for a UPS according to the above aspect of the invention may include, in addition to each configuration described above, features in that the UPS group controller includes an issuing means for issuing the identification information, the UPS member controllers include a requesting means for making the second protocol communication means transmit an identification information issue request, and the selecting means makes use of the identification information issued by the issuing means according to the issue request, as their said identification information.

When the configuration described above is adopted, the UPS group controller executes issue of the identification information and transmission of the control data which the identification information is added to. Therefore, the UPS group controller can surely have the UPS member controllers, which have delivered the issue request, control the operating status of the load devices. Furthermore, even when the network setting is changed, the UPS group controller can surely control the operating status of the load devices.

The network communication system for a UPS according to the above aspect of the invention may include, in addition to each configuration described above, features in that the UPS group controller provided in a plurality is connected in a network, and the issuing means of each UPS group controller issues the identification information different from one another.

When the configuration described above is adopted; even if a plurality of UPS group controllers are commonly connected in a network, each of the UPS group controllers can transmit control data to the UPS member controllers within the group of the UPS group controller, by using the identification information that the UPS group controller has generated. Furthermore, there is no chance that each of the UPS member controllers controls the operating status of the load devices by mistake according to control data transmitted by a UPS group controller of another group. As a result, even when the network setting dynamically changes, a plurality of groups can exist in a single network, and a plurality of load devices in each group can be controlled appropriately.

According to another aspect of the present invention; a method for grouping controllers by UPS in a network communication system in which control data are transmitted from UPS group controllers corresponding to respective UPSs to UPS member controllers corresponding to respective load devices of the UPSs through a common network for controlling operating status of each of the load devices according to power supply condition of each of the UPSs. In the method for grouping, only one group of controllers are connected in the network and each of the controllers is made communicate within the group to be issued identification information to be transmitted with control data. By repeating these steps, each of controllers of all groups to be connected in the network is issued identification information different from one another. After this, all of the controllers are connected in the network.

By issuing identification information to each controller according to this method, each specific identification information is issued to all groups of controllers connected in the network. Furthermore, identification information is issued to each of controllers of each group through communication within the group. Therefore, one of the controllers of each group can recognize the identification information of other controllers of the same group so that the controller can transmit control data to the other controllers of the same group by using the identification information. The controllers being connected in the single network can easily be grouped for each UPS.

Moreover, procedures for issuing identification information to each controller in each group are the same as those in the case where the controllers of one group are recognized one another in the network. Therefore, without becoming conscious of the number of groups of controllers to be connected in the network, a user can simply repeat the procedures of the case where the controllers of one group are prepared in the network so as to issue the identification information for multiple groups of controllers existing together in the single network. Then, taking advantage of an aspect that the control data can be received and transmitted appropriately with reference to the identification information even though the network setting changes dynamically, the user can easily set up the plurality of controller groups existing together in the single network, for each UPS.

According to the present invention, continuous communication for controlling operating status of load devices of a UPS is enabled even though network setting is changed due to power interruption and the like.

DETAILED DESCRIPTION OF THE INVENTION

Figure 1:
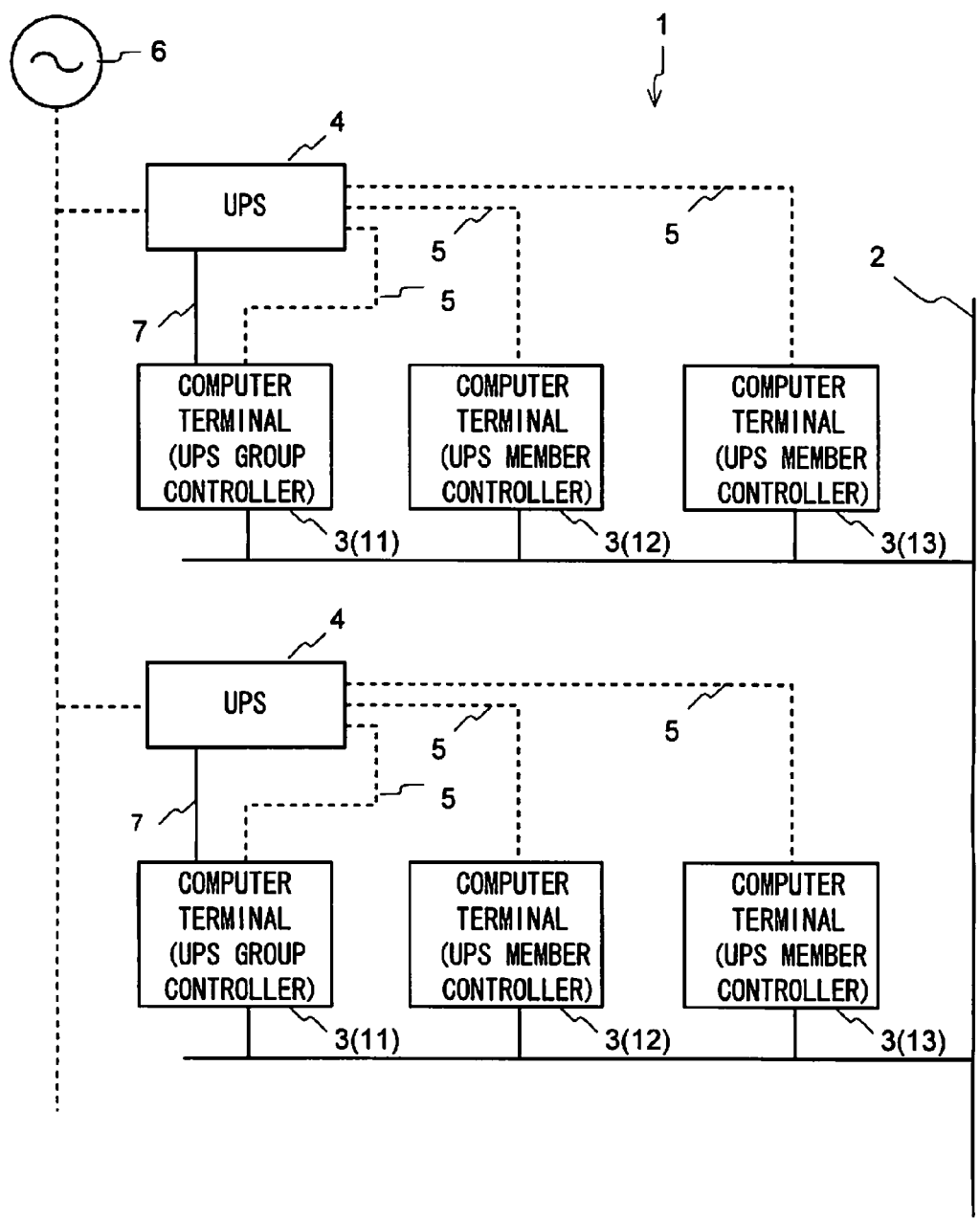
FIG. 1 is a system block diagram showing an embodiment of a network communication system according to the present invention.

Reference Numerals 1. network communication system (network communication system for a UPS)
2. network
4 and 91. UPSs
3. computer terminals (load devices)
11. UPS group controller
12 and 13. UPS member controllers
22. memory (storage means)
23. group control unit (generating means)
24. higher ID processing section (adding means and issuing means)
25. TCP/IP section (first protocol communication means)
45 and 65. TCP/IP section (second protocol communication means)
44 and 64. lower ID processing section (selecting means and requesting means)
92. communication device Described below with reference to the accompanying drawings is an embodiment of a network communication system for a UPS and a method for grouping controllers by UPS, the controllers performing communication for controlling operating status of load devices of UPSs, according to the present invention. In the following description, the network communication system for a UPS will be described as a part of a network communication system for data communication among computer terminals. The method for grouping controllers will be explained as a part of operation of the network communication system.

FIG. 1 is a system block diagram showing an embodiment of a network communication system 1 according to the present invention. The network communication system 1 includes a network 2. In detail, the network 2 includes, for example, communication cables, such as an Ethernet (registered trademark) cable, a coaxial cable, and the like, which are not shown in the drawing; and furthermore includes network devices, such as a router, a hub, a bridge, and the like, which are disposed for connecting the communication cables and are not shown in the drawing. The network 2 may partially or entirely be configured through wireless communication.

A plurality of computer terminals 3 are connected in the network 2. In FIG. 1, six computer terminals 3 are connected. The computer terminals 3 transmit and receive communication data to/from the network 2. Furthermore, the computer terminals 3 execute a program, being not shown, for data communication to transmit and receive communication data among the computer terminals one another by using a predetermined communication protocol.

There exist some communication protocols that are classified according to an OSI reference model established by ISO (International Organization for Standardization). The OSI reference model is composed of 7 layers; i.e., a physical layer, a data link layer, a network layer, a transport layer, a session layer, a presentation layer, and an application layer. Then, with reference to the physical layer, data link layer, network layer, transport layer, etc.; various communication protocols are standardized. Meanwhile, in an actual network communication system; the session layer and presentation layer, for example, are most likely integrated into the application layer.

For example, Internet Protocol (IP) is standardized as a communication protocol for the network layer; while Transmission Control Protocol (TCP), for example, is standardized as a communication protocol for the transport layer.

For Internet Protocol, IP addresses are used. IP addresses are a kind of network setting, and a specific IP address is assigned to each of the computer terminals 3 connected in the network 2. In the network communication system 1 of the present embodiment, the IP address of each of the computer terminals 3 may be either fixedly specified or automatically given at the start-up time from a DHCP (Dynamic Host Configuration Protocol) server, not shown in the drawing. An automatically given IP address would change, for example, at the time of power interruption and restoration thereafter.

Figure 4:
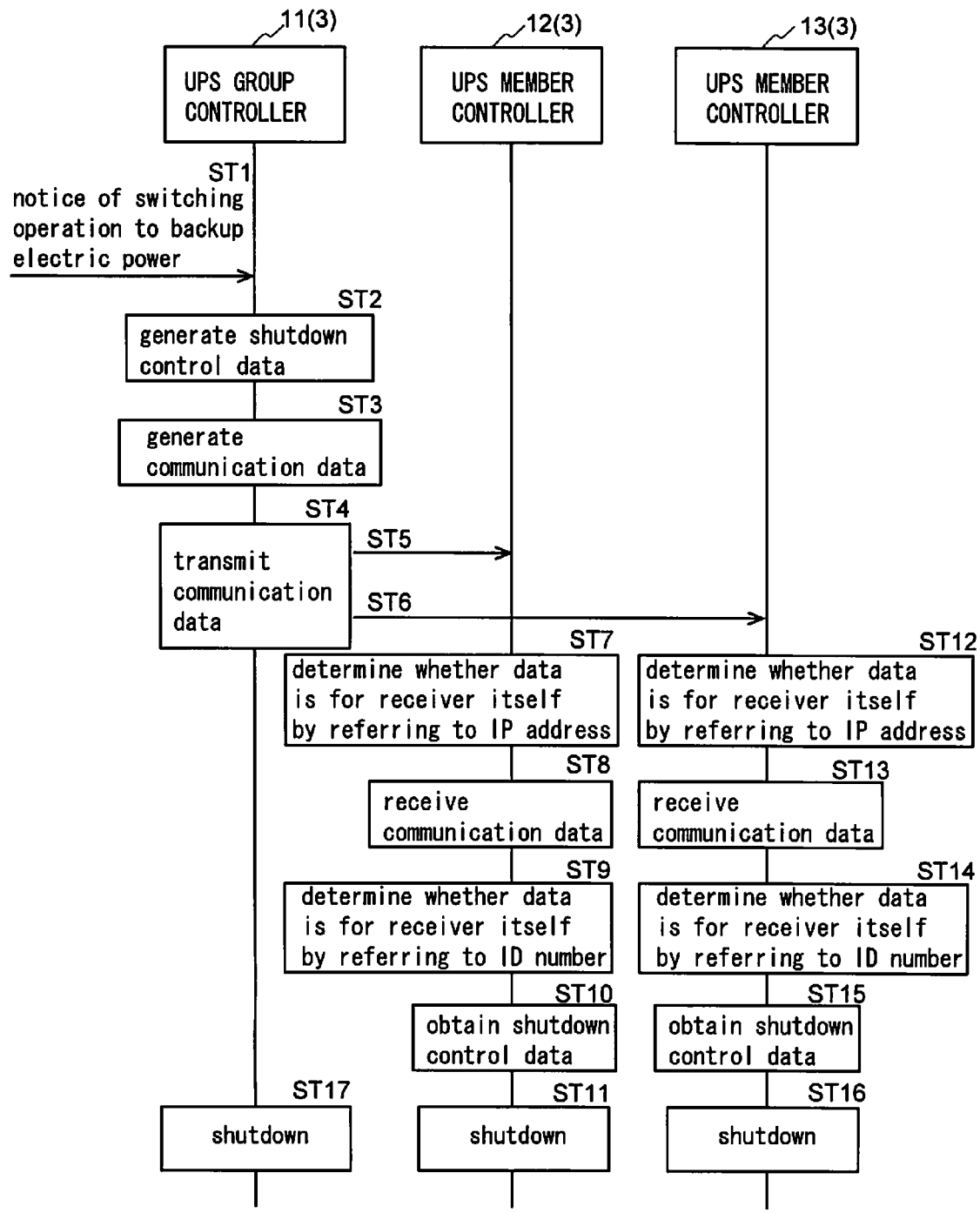
FIG. 4 is a timing diagram showing procedures for shutting down load devices.

The plurality of computer terminals 3 shown in FIG. 4 are also connected to a plurality of UPSs 4 with power supply cables 5 so as to be supplied with electric power from the connected UPSs 4. The UPSs 4 are connected between a commercial AC power source 6 and the computer terminals 3 as load devices. When the AC power supplied from the commercial AC power source 6 is in normal condition, the UPSs 4 supply the AC power to the computer terminals 3 (commercial power supplying condition). When the AC power is out of normal condition owing to power interruption and the like, the UPSs 4 supply the computer terminals 3 with AC power generated by using electric power stored in a built-in battery, not shown in the drawing (backup power supplying condition). According to the control operation described above, the computer terminals 3, supplied with electric power by the UPSs 4, can still continue operation even under power interruption, and furthermore accomplish shutdown operation suitably in the period of supplying backup electric power.

Figure 2:
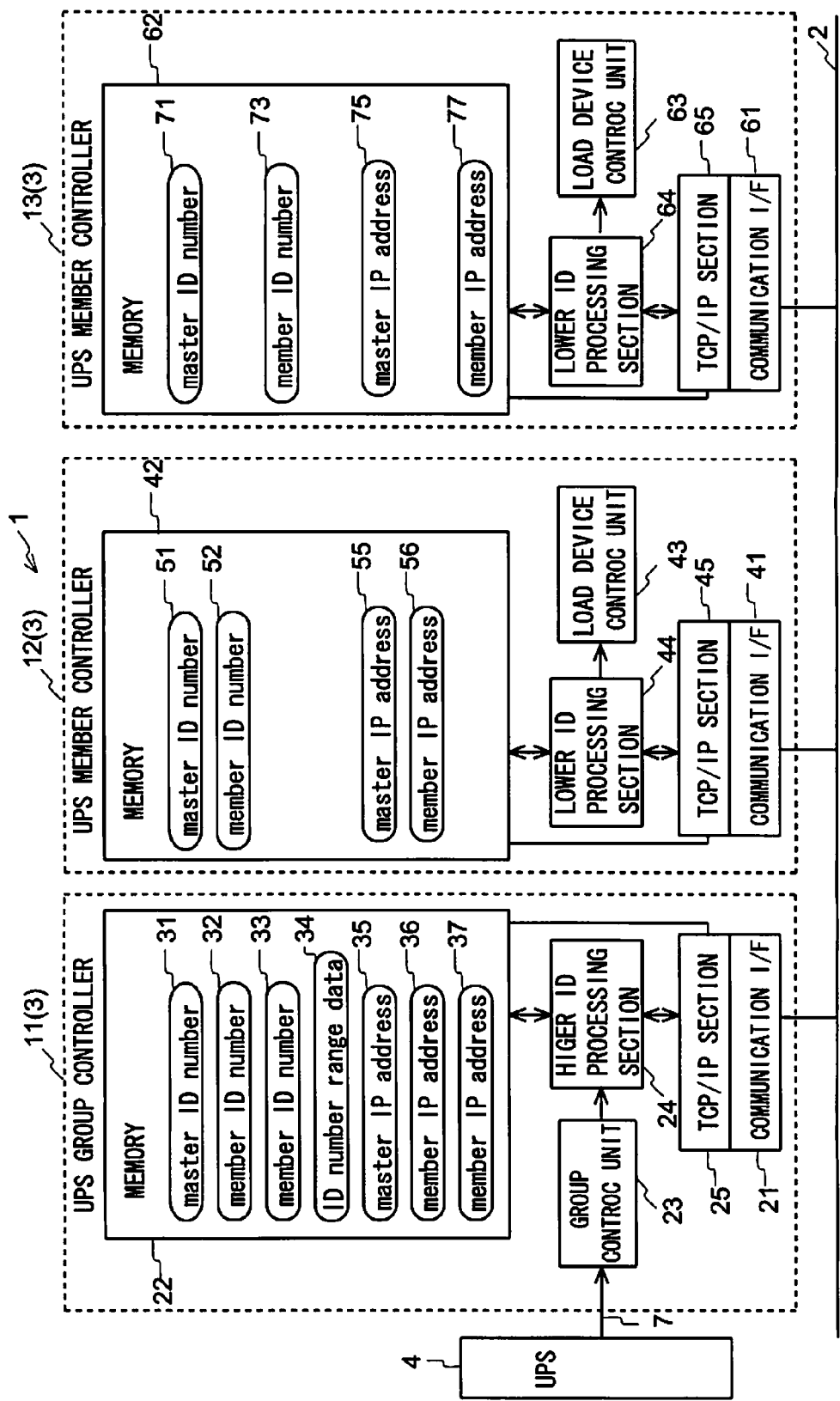
FIG. 2 is a block diagram showing a network communication system for a single UPS embodied in the network communication system shown in FIG. 1.

FIG. 2 is a block diagram showing a network communication system 1 for a single UPS 4 realized by the network communication system 1 shown in FIG. 1. The network communication system 1 for the UPS 4 includes one UPS group controller 11, and two UPS member controllers 12 and 13.

The UPS group controller 11 is connected to the UPS 4 with a communication cable 7, and the UPS group controller 11 is provided in a computer terminal 3 (the computer terminal 3 positioned at a left end of each line in FIG. 1) that directly communicates with the UPS 4. Though the UPS group controller 11 in FIG. 1 is supplied with electric power by the UPS 4, the UPS group controller 11 may be either supplied with electric power by another UPS 4, or directly connected to the commercial AC power source 6. However, it is preferable that the UPS group controller 11 is supplied with electric power by any UPS, since it needs to operate even in power interruption.

The UPS group controller 11 includes a communication I/F (Interface) 21 to which the network 2 is connected, a CPU (Central Processing Unit) not shown in the drawing, and a memory 22. As the CPU executes a program, which is not shown in the drawing and saved in the memory 22, the UPS group controller 11 puts into practice functions of a group control unit 23, a higher ID (Identification) processing section 24, a TCP/IP section 25, and the like.

The group control unit 23, functioning as a generating means, controls the load devices 3 to 3 of the UPS 4 connected to the UPS group controller 11, and generates control data for controlling operating status of the load devices 3 to 3. For example, if once judging according to a notice of power supply status from the UPS 4 that the UPS 4 has switched from the commercial power supplying condition to the backup power supplying condition, the group control unit 23 generates shutdown control data for shutting down the load devices 3 to 3. Then, the group control unit 23 supplies the generated control data to the higher ID (Identification) processing section 24. If the control data is directly supplied from the group control unit 23 to the TCP/IP section 25, the control data becomes ready to be transmitted as communication data by the TCP/IP section 25.

The memory 22 of the UPS group controller 11, functioning as a storage means, stores its IP address (master IP address 35) as well as IP addresses (member IP addresses 36 and 37) of all UPS member controllers included in the group. Furthermore, the memory 22 stores its ID number (master ID number 31) as well as ID numbers (member ID numbers 32 and 33) of all the UPS member controllers included in the group. These ID numbers 31 to 33 are specific numbers at least within the network 2. Still further, the memory 22 stores ID number range data 34 for specifying a range of ID numbers to be issued. As shown with two groups in FIG. 1; in the case where plural groups of controllers are connected in a single network 2, the ID number range data 34 stored in each UPS group controller 11 is so specified as to have a specific range that is different from each other among the plural sets of ID number range data.

The higher ID processing section 24, functioning as an adding means and an issuing means, is provided in an application layer together with the group control unit 23. The higher ID processing section 24 chooses one unused ID number out of a range of ID numbers prescribed with the ID number range data 34, and issues the chosen ID number to a UPS member controller of the group. Furthermore, the higher ID processing section 24 adds, for example, the ID number of a UPS member controller as a destination (member ID number 32 or 33) to the control data generated by the group control unit 23, and supplies it as communication data to the TCP/IP section 25. The higher ID processing section 24 may as well add the ID number of a source (i.e., its master ID number 31) in addition to the ID number of the destination (member ID number 32 or 33) to the control data.

The TCP/IP section 25 of the UPS group controller 11, as a first protocol communication means, executes data communication through the network 2 according to TCP/IP setting (network setting) to transmit/receive communication data to/from another TCP/IP section (a TCP/IP section 45 or 65 of the UPS member controllers in FIG. 2) in the network 2.

Concretely to describe for example, the TCP/IP section 25 adds the IP address 36 or 37 of the destination, the IP address 35 of the source, and the like, which are read out from the memory 22, to the communication data to be transmitted to generate packet data. The TCP/IP section 25 supplies the generated packet data to the communication I/F 21. The communication I/F 21 transmits the packet data supplied from the TCP/IP section 25 to the network 2.

The communication I/F 21 also receives packet data existing on the network 2 and supplies it to the TCP/IP section 25. The TCP/IP section 25 compares the IP address of the destination existing in the packet data with its IP address (master IP address 35) read out from the memory 22. Then, if the compared addresses mentioned above are the same, the TCP/IP section 25 receives the communication data, and supplies it to the higher ID processing section 24.

Figure 3:
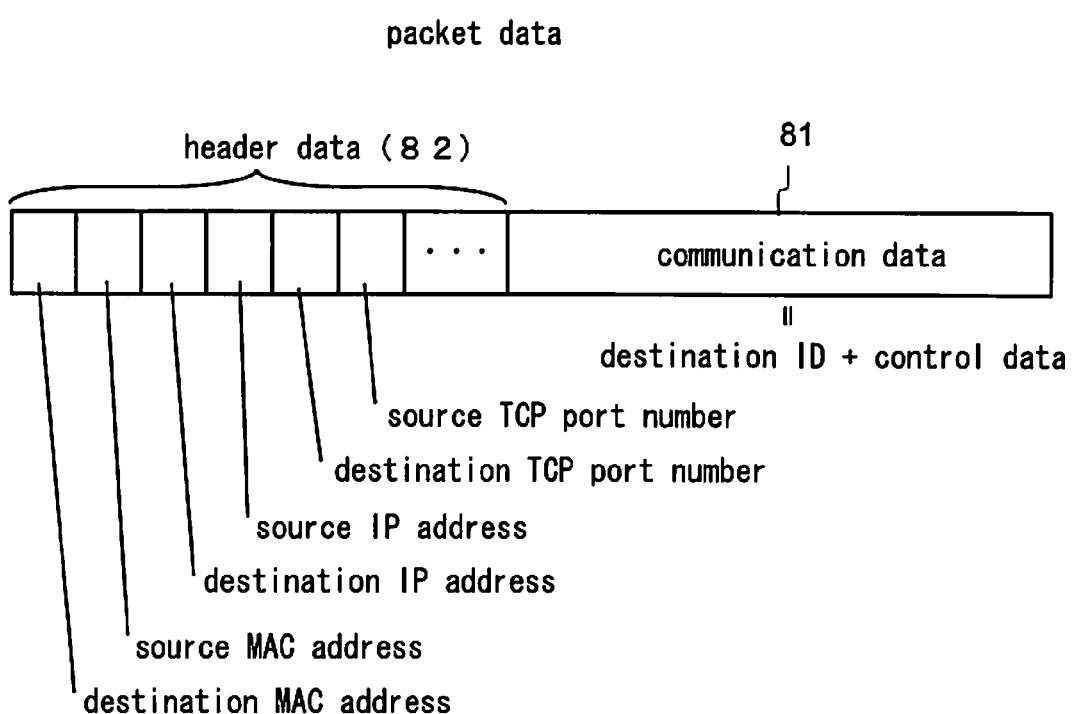
FIG. 3 is a data structure explanatory diagram showing an example of packet data.

FIG. 3 is a data structure explanatory diagram showing an example of packet data. The packet data comprises communication data 81 and header data 82 added ahead. The header data 82 has various information; including, a MAC address (Media Access Control Address) of the destination, a MAC address of the source, an IP address of the destination, an IP address of the source, a TCP port number of the destination, and a TCP port number of the source. The communication data 81 is actual data transmitted according to a prescribed communication protocol; and in an example of FIG. 3, it is composed of an ID number of the destination and control data.

The UPS member controllers 12 and 13 are supplied with electric power by the UPS 4, and these controllers are provided in computer terminals 3 (the computer terminals 3 positioned at a middle and a right end of each line in FIG. 1) that do not directly communicate with the UPS 4.

The UPS member controllers 12 and 13 include communication I/Fs 41 and 61 to which the network 2 is connected, CPUs not shown in the drawing, and memories 42 and 62, respectively. As the CPUs execute programs, which are not shown in the drawing and saved in the memories 42 and 62, the UPS member controllers 12 and 13 put into practice functions of load device control units 43 and 63, lower ID processing sections 44 and 64, TCP/IP sections 45 and 65, and the like.

The memories 42 and 62 of the UPS member controllers 12 and 13 store their IP addresses (member IP addresses 56 and 77) as well as IP addresses (master IP addresses 55 and 75) of the UPS group controller 11 that controls the group. Furthermore, the memories 42 and 62 store their ID numbers (member ID numbers 52 and 73) as well as ID numbers (master ID numbers 51 and 71) of the UPS group controller 11 that controls the group.

The TCP/IP sections 45 and 65 of the UPS member controllers 12 and 13, as a second protocol communication means, execute data communication through the network 2 according to TCP/IP setting (network setting) to transmit/receive communication data to/from another TCP/IP section (a TCP/IP section 25 of the UPS group controller 11 in FIG. 2) in the network 2.

Concretely to describe for example, the communication I/Fs 41 and 61 receive packet data existing on the network 2 and supply it to the TCP/IP sections 45 and 65. The TCP/IP sections 45 and 65 compare the IP address of the destination existing in the header data 82 with their IP addresses (member IP addresses 56 and 77) read out from the memories 42 and 62. Then, if the compared addresses mentioned above are the same, the TCP/IP sections 45 and 65 receive the communication data, and supply it to the lower ID processing sections 44 and 64.

The lower ID processing sections 44 and 64, functioning as a selecting means and a requesting means, are provided in an application layer together with the load device control units 43 and 63. The lower ID processing sections 44 and 64 compare, for example, the ID numbers of the destination existing in the communication data supplied from the TCP/IP sections 45 and 65 with their ID numbers (member ID numbers 52 and 73) read out from the memories 42 and 62. Then, if the compared ID numbers mentioned above are the same, the lower ID processing sections 44 and 64 obtain control data existing in the communication data, and supply it to the load device control units 43 and 63.

The load device control units 43 and 63 interpret the control data that has been generated by the group control unit 23 and obtained by the lower ID processing sections 44 and 64, and execute a process directed by the control data. For example, if once shutdown control data is issued for shutting down load devices, the load device control units 43 and 63 execute shutdown operation to shut down the load devices 3 to 3 (their load devices themselves).

Explained below is operation of the network communication system 1 having a configuration described above. In the following explanation as an example, the UPS 4 switches from the commercial power supplying condition to the backup power supplying condition, and then the load devices 3 to 3 are shut down.

FIG. 4 is a timing diagram showing procedures for shutting down load devices.

For example, when power interruption happens, the UPS 4 switches from the commercial power supplying condition to the backup power supplying condition. A power supply control section (not shown in the drawing) of the UPS 4 notifies the group control unit 23 of the UPS group controller 11 that the electric power to be supplied to the load devices has been switched to the backup electric power (Step ST1).

According to the notice of the switching operation to the backup electric power, the group control unit 23 of the UPS group controller 11 generates shutdown control data (Step ST2). Specifically to describe for example, the group control unit 23 generates the shutdown control data when a predetermined period (2 minutes, for example) has passed after the notice of the switching operation to the backup electric power. Then, the group control unit 23 supplies the generated shutdown control data to the higher ID processing section 24.

When the shutdown control data is given, the higher ID processing section 24 of the UPS group controller 11 executes a process to generate the communication data 81 for transmitting the shutdown control data to all the UPS member controllers 12 and 13 within the group (Step ST3). Specifically to describe for example, the higher ID processing section 24 reads one of the ID numbers of the destination (member ID numbers 32 and 33) of the UPS member controllers 12 and 13 from the memory 22, adds the read ID number to the shutdown control data, and supplies it as a set of communication data 81 to the TCP/IP section 25. Thus, the higher ID processing section 24 reads every member ID number; i.e., the member ID numbers 32 and 33, which have been issued and stored in the memory 22; generates the communication data 81 of the same number of sets of the member ID numbers 32 and 33, and supply the data to the TCP/IP section 25.

When the communication data 81 is given, the TCP/IP section 25 executes a process to transmit each set of the communication data 81 to each corresponding one of the UPS member controllers 12 and 13 (Step ST4). Specifically to describe for example, the TCP/IP section 25 reads an IP address, etc. for the destination of the set of the communication data 81 from the memory 22, generates packet data to which the read IP address, etc. for the destination is added, and supplies the data to the communication I/F 21. The communication I/F 21 transmits the given packet data to the network 2. The TCP/IP section 25 transmits the packet data of the same number of sets of the member ID numbers 32 and 33, stored in the memory 22, to the communication I/F 21 (Steps ST5 and ST6).

While the UPS group controller 11 executes a process to transmit the packet data including the shutdown control data, the communication I/Fs 41 and 61 of the UPS member controllers 12 and 13 receive the packet data on the network 2, and supplies the data to the TCP/IP sections 45 and 65. Each of the TCP/IP sections 45 and 65 of the UPS member controllers 12 and 13 determines whether or not the packet data is for the TCP/IP section itself (Steps ST7 and ST12). Specifically, the TCP/IP sections 45 and 65 compare the IP address of the destination existing in the header data 82 with their IP addresses (member IP addresses 56 and 77) stored in each of the memories 42 and 62. Then, if the compared addresses mentioned above are the same, the TCP/IP sections 45 and 65 receive the communication data, and supply it to the lower ID processing sections 44 and 64 (Steps ST8 and ST13).

Packet data, whose destination is specified with the IP address of the UPS member controller 12 illustrated at the middle position in FIG. 2, is received by the TCP/IP section 45 of the UPS member controller 12 at the middle position as well as the TCP/IP section 65 of the UPS member controller 13 at the right end. Then, the TCP/IP section 45 of the UPS member controller 12 at the middle position determines that the received IP address of the destination is the same as its own IP address 56, and supplies the communication data 81 to the lower ID processing section. On the other hand, the TCP/IP section 65 of the UPS member controller 13 at the right end determines that the received IP address of the destination is not the same as its own IP address 77, and does not supply the communication data 81 to the lower ID processing section 64.

The TCP/IP section 25 of the UPS group controller 11 individually transmits the packet data to each of all the IP addresses 36 and 37 stored in the memory 22. Therefore, according to each different packet data, the communication data 81 including the shutdown control data of the same contents is transmitted to the lower ID processing sections 44 and 64 of all the UPS member controllers 12 and 13 within the group.

When being provided with the communication data 81 including the shutdown control data, each of the lower ID processing sections 44 and 64 compares the ID number of the destination existing in the communication data with its ID number (member ID number 52 or 73) read out from the memories 42 or 62 to determine whether or not the communication data is for the lower ID processing section itself (Steps ST9 and ST14). If the compared ID numbers mentioned above are the same, the lower ID processing sections 44 and 64 obtain the shutdown control data existing in the communication data 81, and supply it to the load device control units 43 and 63. If the compared ID numbers are not the same, the lower ID processing sections 44 and 64 do not supply the shutdown control data to the load device control units 43 and 63 (Steps ST10 and ST15).

In FIG. 2, it is assumed that; for example, the group controller 11 positioned at the left end is assigned "001" as its master ID number 31, and the UPS member controller 12 at the middle position and the UPS member controller 13 at the right end are assigned "002" and "003" as their member ID numbers 52 and 73, respectively. Under the configuration of ID numbers as described above; when communication data 81 including the ID number "002" is transmitted to the UPS member controller 12 at the middle position in FIG. 2, the lower ID processing section 44 at the middle position supplies shutdown control data included in the communication data 81 to the load device control unit 43. When communication data 81 including the ID number "003" is transmitted to the UPS member controller 13 at the right end, the lower ID processing section 64 at the right end supplies shutdown control data included in the communication data 81 to the load device control unit 63. Thus, according to each of multiple sets of packet data, while each set of packet data being transmitted individually, the lower ID processing sections 44 and 64 of all the UPS member controllers 12 and 13 within the group are able to supply the shutdown control data to the load device control units 43 and 63, respectively.

The load device control units 43 and 63 of the UPS member controllers 12 and 13, to which the shutdown control data has been supplied, interpret the shutdown control data that the group control unit 23 generated, and then execute a process directed by the shutdown control data. As shown in FIG. 4; when shutdown control data is supplied, the load device control units 43 and 63 execute a shutdown process to shut down their load devices 3 to 3 (themselves) (Steps ST11 and ST16).

As shown in FIG. 2; if the UPS group controller 11 is a load device 3 of the UPS 4, the group control unit 23 of the UPS group controller 11 execute a shutdown process to shut down the group control unit itself (Step ST17) after executing transmission of the packet data to all the UPS member controllers 12 and 13 within the group.

The group control unit 23 may as well execute a process to shut down the group control unit itself, for example, if once it is determined that the number of data sets of the communication data generated by the higher ID processing section 24 is the same as the number of the member ID numbers 32 and 33 stored in the memory 22.

According to the processes described above, the UPS group controller 11 and the plurality of UPS member controllers 12 and 13 are shut down. In other words; all the load devices 3 to 3 of the UPS 4, for which power supply has switched to the backup power supplying condition, are shut down. Namely, all the load devices 3 to 3 of the UPS 4 can be shut down properly before the backup electric power of the UPS 4 runs short.

Explained below are ID number obtaining procedures by the UPS member controllers 12 and 13. As exemplified in FIG. 1 including two UPS lines, explained below in particular are ID number obtaining procedures in the case where multiple groups of controllers are connected in the single network 2, wherein each of a plurality of UPSs 4 is independently controlled.

Figure 5:
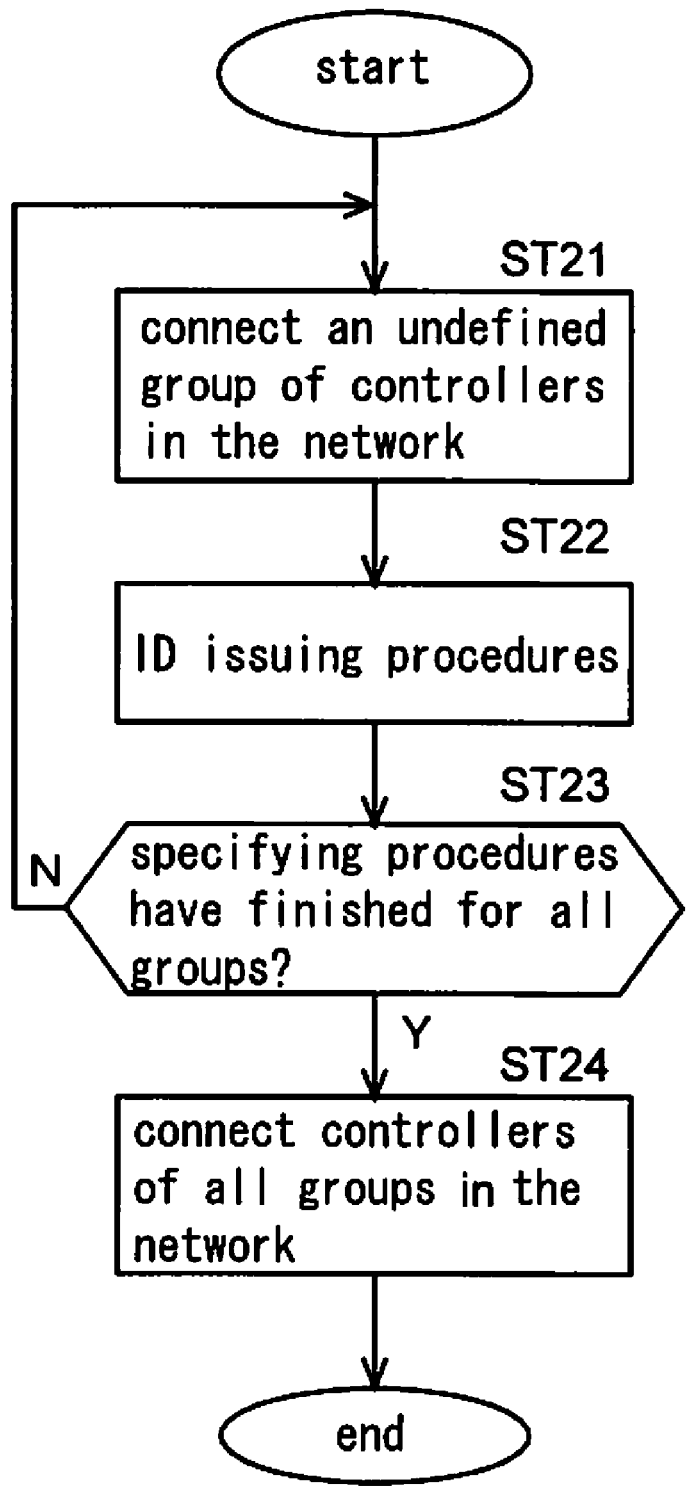
FIG. 5 is a flowchart explaining procedures for grouping controllers connected in a network.

FIG. 5 is a flowchart explaining procedures of grouping controllers connected in the single network 2.

In the case where groups of controllers are to be commonly connected in the single network 2, a group of controllers undefined is connected in the network 2 (Step ST21). Then, with regard to the controllers connected in the network 2, ID number obtaining procedures are executed (Step ST22).

When a group of controllers is connected in the network 2, the condition of controller connection in the network 2 is as shown in FIG. 2. Namely, connected in the network 2 are a single UPS group controller 11, which directly communicates with an UPS 4, and a plurality of UPS member controllers 12 and 13 that control operating status of all load devices 3 to 3 to be supplied with electric power from the UPS 4.

Figure 6:
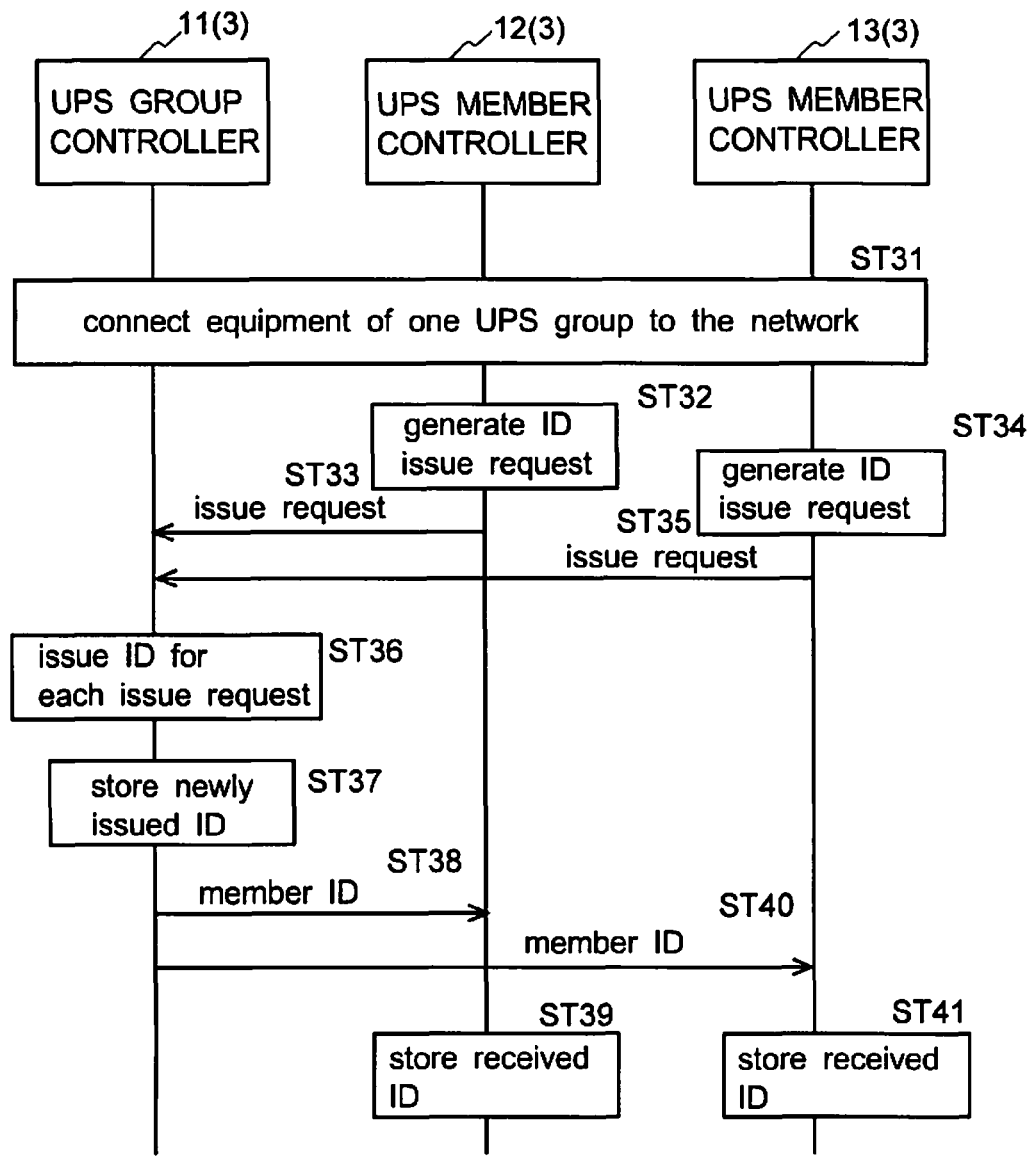
FIG. 6 is a timing diagram showing procedures for issuing ID numbers for each UPS.

FIG. 6 is a timing diagram showing procedures of issuing ID numbers for each UPS 4.

When a group of controllers undefined is connected in the network 2 (Step ST31), each of the lower ID processing sections 44 and 64 of the UPS member controllers 12 and 13 determines, for example, whether or not a booting operation at the time is an initial one. If it is an initial booting operation, each of the lower ID processing sections generates an ID number issue request (Step ST32 or ST34). Then, the lower ID processing sections 44 and 64 supply the generated ID number issue request as communication data to the TCP/IP sections 45 and 65. Alternatively, the lower ID processing sections 44 and 64 may determine whether or not their ID numbers (member ID numbers 52 and 73) are already registered in the memories 42 and 62, and may generate the ID number issue request accordingly when their ID numbers are not yet registered.

If once the ID number issue request is given, the TCP/IP sections 45 and 65 of the UPS member controllers 12 and 13 transmit packet data including the ID number issue request to the communication I/F 41 and 61, respectively. Then, the communication I/Fs 41 and 61 transmit the packet data to the network 2 through broadcast transmission (Steps ST33 and ST35).

The packet data transmitted through broadcast transmission is received by the communication I/F 21 of the UPS group controller 11, and then supplied to the TCP/IP section 25. In the meantime, the TCP/IP section 25 of the UPS group controller 11 determines according to the IP address of the destination existing in the packet data that the packet data has been transmitted through broadcast transmission, so that the TCP/IP section 25 receives the communication data 81 existing in the packet data and supplies it to the higher ID processing section 24.

If once the communication data 81 including the ID number issue request is given, the higher ID processing section 24 executes ID number issuing procedures (Step ST36). Specifically to describe for example, at first in the memory 22, the higher ID processing section 24 checks ID numbers already issued, and specifies an ID number not used yet within a range of the ID number range data 34.

Then, the higher ID processing section 24 generates communication data 81 for notifying the unused ID numbers specified and its own ID number (master ID number 31), and then supplies the communication data 81 to the TCP/IP section 25. Furthermore, the higher ID processing section 24 registers the ID numbers newly specified as the ID numbers of the UPS member controllers 12 and 13 (member ID numbers 32 and 33) within the group in the memory 22 (Step ST37).

The TCP/IP section 25 of the UPS group controller 11 transmits packet data including the communication data 81 to the source of the ID number issue request (Steps ST38 and ST40). The TCP/IP sections 45 and 65 of the UPS member controllers 12 and 13, which have transmitted the ID number issue request, receive the packet data through the communication I/Fs 41 and 61, and supply the communication data 81 to the lower ID processing sections 44 and 64. Then, the lower ID processing sections 44 and 64 obtain the ID numbers issued by the UPS group controller 11 and the ID number of the UPS group controller 11, all the ID numbers existing in the communication data 81, and store the ID numbers in the memories 42 and 62 (Steps ST39 and ST41).

According to the procedures described above, the memories 42 and 62 of the UPS member controllers 12 and 13 within the single group store the ID numbers (master ID numbers 51 and 71) for the UPS group controller 11, which communicates with the UPS 4 for supplying electric power to the load devices 3 to 3 to be controlled by the UPS member controllers, as well as their own ID numbers (member ID numbers 52 and 73) issued by the UPS group controller 11.

Referring to FIG. 5 again; when all the UPS member controllers within the single group have accomplished the ID number obtaining procedures, an operator decides whether or not the setting procedures have finished with regard to all groups (Step ST23).

When the setting procedures have not finished with regard to all groups, all the controllers of the groups for which the setting procedures have already finished are removed from the network 2, and then controllers of a next one group are connected in the network 2 (Step ST21). Subsequently, ID numbers of UPS member controllers are issued in each group by the UPS group controller 11 of the group (Step ST22).

When all groups commonly connected in the single network 2 have accomplished the ID number obtaining procedures ("Y" at the branch of Step ST 23), all the controllers are connected to the network 2 (Step ST24) in the end.

According to the connection to the network 2 and the ID number issuing procedures with regard to each UPS 4 as described above, the member ID numbers 32 and 33 being different from each other are issued to each of the UPS member controllers 12 and 13. Furthermore, the member ID numbers of the UPS member controllers 12 and 13 are issued by each UPS group controller 11 that communicates with the UPS 4 for supplying electric power to the load devices 3 to 3 whose operating status is controlled by each of the UPS member controllers. Thus, each UPS group controller 11 can control the ID numbers of all the UPS member controllers 12 and 13 within each corresponding group.

The higher ID processing section 24 of each UPS group controller 11 can transmit shutdown control data to all the UPS member controllers 12 and 13 within the group by transmission of the shutdown control data, to which the member ID numbers 32 and 33 registered in the memory 22 are added, to the TCP/IP section 25; and therefore the higher ID processing section can appropriately shut down the load devices 3 to 3 of the UPS 4.

Thus, in the present embodiment, the UPS group controller 11 transmits the control data to the UPS member controllers 12 and 13 within the corresponding group by using the member ID numbers 32 and 33 issued by the UPS group controller 11. The higher ID processing section 24 of the UPS group controller 11 particularly adds the member ID numbers 32 and 33 issued for each of the UPS member controllers 12 and 13 to the control data to generate the communication data 81. Then, the TCP/IP section 25 transmits the communication data 81 according to a predetermined communication protocol.

In the network 2 particularly; the UPS group controller 11 and the UPS member controllers 12 and 13 are divided by using their IP addresses. The UPS group controller 11 and the UPS member controllers 12 and 13 execute data communication by using the ID numbers issued in a protocol layer higher than Internet Protocol, such as an application layer. The ID numbers are included in the communication data in Internet Protocol, together with the control data.

Therefore, even if the network setting (for example, IP addresses) is changed, the UPS member controllers 12 and 13 of each group choose the control data addressed to the UPS member controllers themselves individually, by using the member ID numbers 32 and 33 that are not affected by the change, so that the UPS member controllers can control operating status of the load devices 3 to 3 according to the control data. Therefore, even when the network setting is changed due to power interruption and the like, the control data for controlling the operating status of the load devices 3 to 3 can be transmitted continuously.

Accordingly; even if the network setting, such as IP addresses, changes dynamically, or even though the network setting is changed due to BOOTP (Bootstrap Protocol) and the like, or even under a network environment where no name resolution can be used; the network communication system 1 of the present embodiment can carry on communication among the controllers for maintaining and controlling the UPS 4 and the load devices 3 to 3 without being affected by various impediments, such as replacement of the communication I/Fs 21, 41, and 61, power recovery, and the like. The controllers can control and continuously regulate operating status of the load devices 3 to 3 by using the communication being carried on.

The existing network 2 (which is a non-dedicated network, and also a computer network) already configured for the purpose of communication among the computer terminals 3 can be used, without establishing an extra network in the network communication system 1 for the UPS 4. There is no restriction required regarding the network setting, such as fixing IP addresses of the computer terminals 3, for using the network 2 commonly. Therefore, any kind of said network 2 can be used as the network communication system 1 for a UPS.

The UPS group controller 11 in each group of the present embodiment is a computer terminal 3 that directly communicates with the UPS 4, and the UPS group controller 11 is supplied with electric power by the UPS 4. The group control unit 23 of the UPS group controller 11 shuts down itself after transmission of control data to the network 2 by using the TCP/IP section 25. Accordingly, while transmitting shutdown control data for shutting down the UPS member controllers 12 and 13 as load devices 3 to 3 during power interruption, the UPS group controller 11 can shut down the UPS group controller 11 itself as a load device 3 of the UPS 4. Furthermore, still under the condition, it is not required to enable the UPS 4 to communicate in the network 2.

The UPS member controllers 12 and 13 of the present embodiment are computer terminals 3 supplied with electric power from the UPS 4. Therefore, the computer terminals 3 as the UPS member controllers 12 and 13 can shut down appropriately under the backup power supplying condition by the UPS 4.

As shown in FIG. 6, the load device control units 43 and 63 of the UPS member controllers 12 and 13 according to the present embodiment make the TCP/IP sections 45 and 65 transmit the ID number issue request. According to the request, the higher ID processing section 24 of the UPS group controller 11 newly issues the member ID numbers 32 and 33 that are not yet used. Then, the higher ID processing section 24 transmits control data to the UPS member controllers 12 and 13 by using the member ID numbers 32 and 33.

Thus, the UPS group controller 11 executes an issue of the ID numbers and transmission of the control data in which the ID numbers are added to; and therefore, the UPS group controller can surely have the UPS member controllers 12 and 13, which have delivered the ID number issue request, control the operating status of the load devices 3 to 3. Even when the network setting is changed, the UPS group controller 11 can surely control the operating status of the load devices 3 to 3.

In the present embodiment; a plurality of UPS group controllers 11 to 11, commonly connected in the network 2, issue member ID numbers that are different from each other. Therefore, each of the UPS group controllers 11 to 11 can transmit control data to the UPS member controllers 12 and 13 of the group of the UPS group controller, by using the member ID numbers that the UPS group controller has generated. Furthermore, there is no chance that each of the UPS member controllers 12 and 13 controls the operating status of the load device 3 by mistake according to control data transmitted by a UPS group controller 11 of another group. Therefore, even when the network setting changes dynamically, a plurality of groups can exist in a single network 2, and a plurality of load devices 3 to 3 in each group can be controlled appropriately.

Still further, in the present embodiment; a plurality of controllers commonly connected in the network 2 are grouped for each UPS 4. As shown in FIG. 5, while controllers of only one group being connected in the network 2, communication is carried out among the controllers of the group to issue an ID number for each of UPS member controllers 12 and 13. By repeating this step, controllers of all groups to be connected in the network 2 are individually provided with ID numbers that are different from one another; and after that, all the controllers are connected in the network 2.

At the time when the ID numbers are issued and grouped according to the procedures described above, each of the ID numbers that are different from one another is issued for each of the controllers connected in the single network 2. Furthermore, controllers of each group are provided with ID numbers that are commonly recognized by the controllers of the group. Therefore, one of the controllers of each group can recognize the ID numbers of other controllers of the group so that the controller can transmit control data to the other controllers of the group by using the ID numbers. The controllers being connected in the single network 2 can easily be grouped for each UPS 4.

Moreover, in the grouping procedures; the ID number issuing procedures for the controllers of each one of the groups are exactly the same as those in the case where the controllers of one group are connected in the network 2. Therefore, without becoming conscious of the number of groups of controllers to be connected in the network 2, and/or additional groups to be connected later, a user can simply repeat the procedures of the case where the controllers of one group are connected in the network 2, for each group; so as to issue ID numbers for controllers of multiple groups existing together in the single network 2, while the ID numbers being effective for each group individually. Then, taking advantage of an aspect that the controllers of each group can receive control data appropriately with reference to the ID numbers even though the network setting changes dynamically, the user can easily group the plurality of controller groups existing together in the single network 2, for each UPS.

The embodiment described above is an example of a preferred embodiment according to the present invention, but the present invention is not limited to the above embodiment and various variations and modifications may be made without changing the concept of the present invention.

Figure 7:
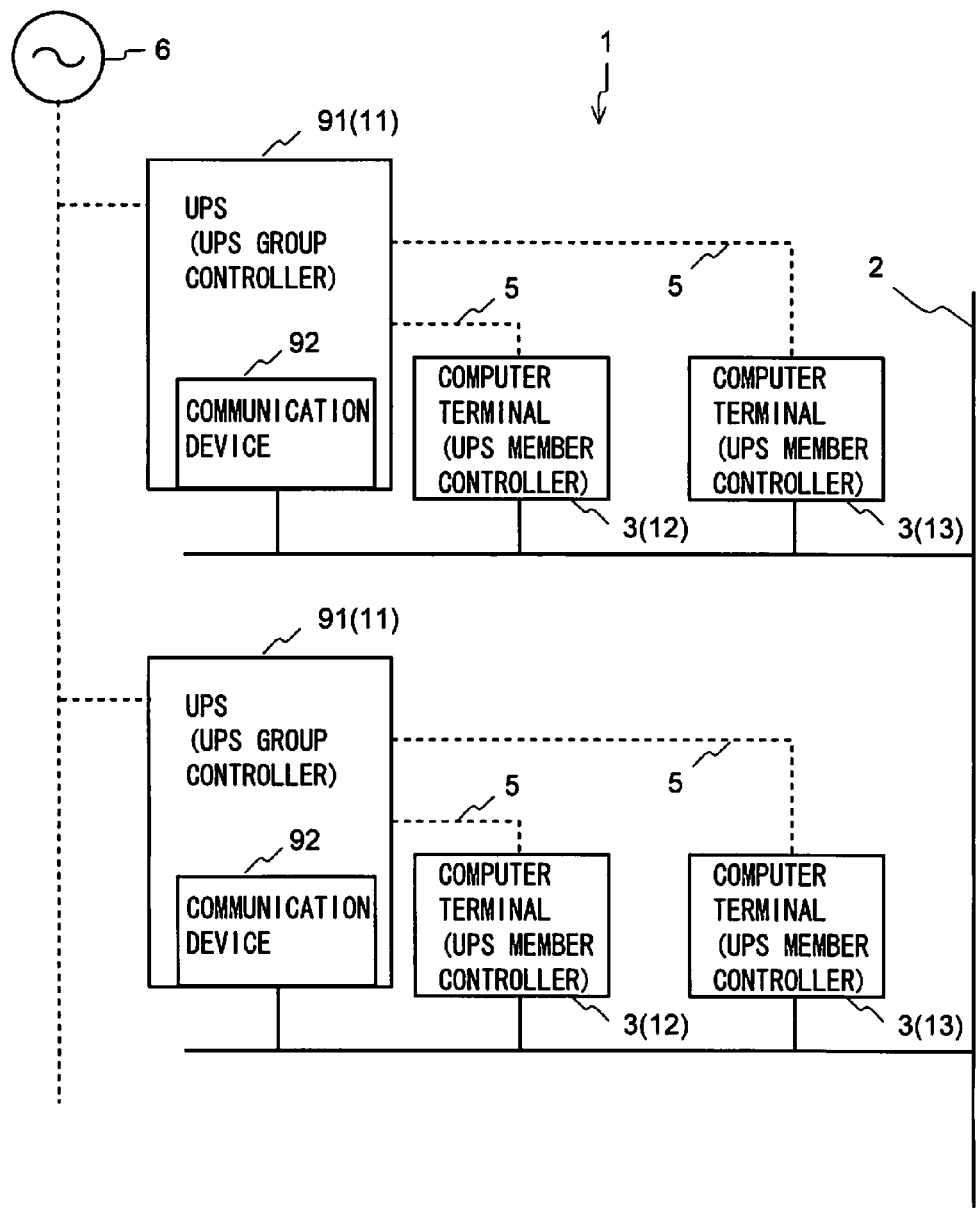
FIG. 7 is a system block diagram showing a modified embodiment of a network communication system for UPSs in which UPS group controllers are embodied in the UPSs.

In the embodiment described above, the UPS group controller 11 is provided in the computer terminal 3, as shown in FIG. 1. On another occasion, for example, the UPS group controller 11 may be provided in a UPS. FIG. 7 is a system block diagram showing a network communication system 1 for UPSs of a modification in which UPS group controllers 11 are provided in the UPSs 91.

In particular, each of the UPSs 91 shown in FIG. 7 includes a communication device 92 that is detachable from a UPS 4. In this modification, it is preferable that a TCP/IP section 25 and a communication I/F 21 of a UPS group controller 11 are provided in the communication device 92, while a group control unit 23 and a higher ID processing section 24 are provided in the UPS 91.

In a configuration of this modification; even when the communication device 92 detachable from the UPS 91 is replaced, the UPS 91 as the UPS group controller 11 holds member ID numbers 32 and 33, which are already issued, so that the UPS can add the member ID numbers to control data, and transmit the data to UPS member controllers 12 and 13. Furthermore, required are neither preparing a computer terminal 3 for a function of the UPS group controller 11, nor connecting the computer terminal 3 to the UPS 4 with a communication cable 7.

Therefore; even if the network setting, such as IP addresses, changes dynamically, or even though the network setting is changed due to BOOTP (Bootstrap Protocol) and the like, or even under a network environment where no name resolution can be used; a network communication system 1 of this modification can also carry on communication among the controllers for maintaining and controlling the UPS 91 and the load devices 3 to 3 without being affected by various impediments, such as replacement of the communication device 92, power recovery, and the like. Then, the controllers can control and continuously regulate operating status of the load devices 3 to 3 by using the communication being carried on.

In the embodiments described above, explained are the examples in which the UPS group controller 11 transmits the shutdown control data to the UPS member controllers 12 and 13 to shut down the load devices 3 to 3 according to the data. Alternatively, for example, the UPS group controller 11 may transmit start-up control data to the UPS member controllers 12 and 13 to start up the load devices 3 to 3 according to the data. However, if the UPS member controllers 12 and 13 are the load devices 3 to 3; the TCP/IP sections 45 and 65, the lower ID processing sections 44 and 64, and the load device control units 43 and 63 are not provided under shutdown condition. In this case, the communication I/Fs 41 and 61 of the UPS member controllers 12 and 13 may start up the computer terminal 3 according to the start-up control data described above so as to provide the TCP/IP sections 45 and 65, the lower ID processing sections 44 and 64, and the load device control units 43 and 63 through the startup-up procedures.

The present invention can be applied suitably when a plurality of UPSs and load devices are regulated and controlled through a network.

The invention claimed is:

1. A network communication system for an uninterruptible power supply comprising:
UPS member controllers for controlling operating status of load devices of said uninterruptible power supply;
a UPS group controller for generating control data for said UPS member controllers to control operating status of said load devices according to power supply condition of said uninterruptible power supply; and
a network in which said UPS member controllers and said UPS group controller are connected;
wherein said UPS group controller and said UPS member controllers execute data communication according to a predetermined communication protocol through said network, and said controllers transmit/receive data in which specific identification information issued for each of said UPS member controllers is added to control data as communication data in said data communication according to said predetermined communication protocol.

2. The network communication system for an uninterruptible power supply according to claim 1;
wherein said predetermined communication protocol is to identify said UPS group controller and said UPS member controllers, connected in said network, by using Internet Protocol addresses.

3. A network communication system for an uninterruptible power supply comprising:

UPS member controllers for controlling operating status of load devices of said uninterruptible power supply;

a UPS group controller for generating control data for said UPS member controllers to control operating status of said load devices according to power supply condition of said uninterruptible power supply; and a network in which said UPS member controllers and said UPS group controller are connected;

wherein said UPS group controller includes: a first protocol communication means for executing data communication through said network according to a predetermined communication protocol; a generating means for generating said control data according to power supply condition of said uninterruptible power supply; and an adding means for adding identification information specific to said UPS member controllers to said control data; and said UPS group controller transmits said control data, to which said identification information is added, as communication data to said network by using said first protocol communication means; and said UPS member controllers include: a second protocol communication means for executing data communication through said network to/from said first protocol communication means according to said communication protocol; and a selecting means for selecting said control data, to which their identification information is added, out of communication data that said second protocol communication means receives; and said UPS member controllers control operating status of said load devices according to said selected control data.

4. The network communication system for an uninterruptible power supply according to claim 3;

wherein said UPS group controller is a computer terminal that directly communicates with said uninterruptible power supply, and said UPS group controller is supplied with electric power by said uninterruptible power supply; and said UPS group controller shuts down itself after transmitting said control data to said network by using said first protocol communication means.

5. The network communication system for an uninterruptible power supply according to claim 3;

wherein said UPS group controller is provided in said uninterruptible power supply;

said first protocol communication means is provided in a communication device that is detachable from said uninterruptible power supply; and a storage means for storing said identification information specific to said UPS member controllers, said generating means, and said adding means are provided in said uninterruptible power supply.

6. The network communication system for an uninterruptible power supply according to claim 3;

wherein said UPS member controllers are computer terminals supplied with electric power by said uninterruptible power supply.

7. The network communication system for an uninterruptible power supply according to claim 3;

wherein said UPS group controller includes an issuing means for issuing said identification information;

each of said UPS member controllers includes a requesting means for making said second protocol communication means transmit an identification information issue request; and said selecting means makes use of said identification information issued by said issuing means according to said issue request, as their said identification information.

8. The network communication system for an uninterruptible power supply according to claim 7;

wherein said UPS group controller provided in a plurality is connected in a network; and said issuing means of each UPS group controller issues identification information specific to itself and different from one another.

9. A method for grouping controllers by uninterruptible power supply in a network communication system in which control data are transmitted from UPS group controllers corresponding to respective uninterruptible power supplies to UPS member controllers corresponding to respective load devices of said uninterruptible power supplies through a common network for controlling operating status of each of said load devices according to power supply condition of each of said uninterruptible power supplies, characterized by;

connecting one group of said controllers in said network and making each of said controllers communicate within said group to be issued identification information to be transmitted with control data;

repeating for each of controllers of all groups to be connected in said network and issued identification information different from one another; and then connecting all of said controllers in said network.

* * * * *